(12) United States Patent  (10) Patent No.: US 9,326,196 B1
Sitaram et al.  (45) Date of Patent: Apr. 26, 2016

(54) UPDATING AN OUT-OF-DATE SOURCE NEIGHBOR LIST

(71) Applicant: SPRINT COMMUNICATIONS COMPANY, L.P., Overland Park, KS (US)

(72) Inventors: Krishna Sitaram, Chantilly, VA (US); Daniel Alberto Vivanco, Sterling, VA (US); Chunmei Lu, Great Falls, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 134 days.

(21) Appl. No.: 14/152,504

(22) Filed: Jan. 10, 2014

(51) Int. Cl.
*H04W 24/00* (2009.01)
*H04W 36/00* (2009.01)
*H04B 7/00* (2006.01)
*G01R 31/08* (2006.01)
(Continued)

(52) U.S. Cl.
CPC .......... *H04W 36/0061* (2013.01); *H04W 84/18* (2013.01)

(58) Field of Classification Search
CPC ........ H04B 7/022; H04B 7/26; H04L 41/044; H04L 41/0886; H04L 41/0813; H04L 41/0823; H04W 24/00; H04W 24/02; H04W 24/08; H04W 36/0055; H04W 36/0061; H04W 36/0066; H04W 31/0072; H04W 36/0077; H04W 36/0083; H04W 36/0088; H04W 36/0094; H04W 36/18; H04W 48/20; H04W 76/021; H04W 88/08
USPC .......... 455/63.3, 67.11, 424, 434, 435.1, 436, 455/437, 438, 439, 440, 441, 442, 443, 444, 455/446, 453, 509, 552.1, 524, 525; 370/329, 331, 338, 339, 341
See application file for complete search history.

(56) References Cited

U.S. PATENT DOCUMENTS 8,588,089 B2 * 11/2013 Dottling ................ H04W 24/02 370/252
8,861,494 B2 * 10/2014 Mukhopadhyay .... H04W 4/001 370/338

(Continued)

OTHER PUBLICATIONS

First Action Interview Preinterview Communication dated Oct. 7, 2015 in U.S. Appl. No. 14/152,533, 5 pages.

(Continued)

*Primary Examiner* — Yuwen Pan
*Assistant Examiner* — Paul P Tran (57) ABSTRACT

Systems, methods, and computer-readable media for updating an out-of-date source neighbor list. In embodiments, the method includes maintaining a master neighbor list comprising a plurality of neighbor lists created by self-organizing network (SON) Automatic Neighbor Relation (ANR). Cell pairs in the master neighbor list with zero handover counts are identified. Each cell pair may comprise a source cell and a potential neighbor cell. A distance between each source cell and each corresponding potential neighbor cell having zero handover counts is determined. For each cell pair, a PCI (Physical Cell Identity) associated with a potential neighbor cell is identified. For each potential neighbor cell, an identity of a source neighbor cell in a source neighbor list corresponding to each source cell is determined, wherein the source neighbor cell having and the potential neighbor cell have a matching PCI. The distance between the source cell and the source neighbor cell is determined.

18 Claims, 4 Drawing Sheets

(51) Int. Cl.
  *G06F 11/00* (2006.01)
  *G08C 15/00* (2006.01)
  *H04J 1/16* (2006.01)
  *H04J 3/14* (2006.01)
  *H04L 1/00* (2006.01)
  *H04L 12/26* (2006.01)
  *H04W 4/00* (2009.01)
  *H04W 84/18* (2009.01)

(56) References Cited

U.S. PATENT DOCUMENTS

2005/0130655 A1* 6/2005 Lundh et al. .................. 455/434
2008/0227455 A1* 9/2008 Kim .............................. 455/436
2011/0143743 A1 6/2011 Pollakowski et al.
2011/0268044 A1* 11/2011 Yun et al. ...................... 370/329
2012/0026918 A1 2/2012 Won et al.
2012/0099442 A1 4/2012 Bakker et al.
2012/0275315 A1 11/2012 Schlangen et al.
2014/0073304 A1 3/2014 Brisebois et al.
2015/0043386 A1 2/2015 Rácz et al.

OTHER PUBLICATIONS

First Action Interview Preinterview Communication dated Oct. 6, 2015 in U.S. Appl. No. 14/152,543, 5 pages.
Notice of Allowance dated Nov. 16, 2015 in U.S. Appl. No. 14/152,543, 8 pages.
Notice of Allowance dated Nov. 19, 2015 in U.S. Appl. No. 14/152,533, 11 pages.

* cited by examiner

UPDATING AN OUT-OF-DATE SOURCE NEIGHBOR LIST

CROSS-REFERENCE TO RELATED APPLICATIONS

This application is related by subject matter to the following concurrently filed U.S. Patent Applications: U.S. application Ser. No. 14/152,533, entitled "Overcoming Handover Failure Due to Out-Of-Date Neighbor List,"; and U.S. application Ser. No. 14/152,543, entitled "A Self-Healing Algorithm to Overcome Handover Failure Due to Out-Of-Date Neighbor List,", both of which are incorporated by reference herein.

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, updating an out-of-date source neighbor list. In embodiments, a master neighbor list is maintained by the core network. The master neighbor list may comprise a plurality of neighbor lists created by self-organizing (SON) Automatic Neighbor Relation (ANR). Cell pairs in the master neighbor list with zero handover counts are identified. Each cell pair may comprise a source cell and a potential neighbor cell. A distance between each source cell and each corresponding potential neighbor cell having zero handover counts is determined. For each cell pair, a Physical Cell Identity (PCI) associated with a potential neighbor cell is identified. For each potential neighbor cell, an identity of a source neighbor cell in a source neighbor list corresponding to each source cell is determined, wherein the source neighbor cell and the potential neighbor have a matching PCI. The distance between the source cell and the source neighbor cell is determined.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

SON ANR is a self-optimization feature to dynamically build and maintain optimal neighbor lists for each cell in real-time. SON ANR maintains optimal neighbor lists for each cell by constantly identifying missing neighbors and unused cells and automatically reconfigures the neighbor lists without user intervention. This is typically accomplished based on user equipment's (UE's) reporting signal strength from neighboring cells. SON ANR increases the number of successful handovers and leads to less dropped connections due to missing neighbor relations. It also minimizes the manual handling of neighbor relations when establishing new eNodeBs and when optimizing neighbor lists. SON ANR reduces time consuming and costly tasks as well as reducing operational expenditures. SON ANR is ideal for network roll-outs where cell sites are launched one at a time because SON ANR automatically adapts to the changing network topology.

However, SON ANR causes problems for LTE networks deployed in a pop-corn fashion (where sites may be deployed in a noncontiguous manner). For example, assume eNodeB1 and eNodeB3 are deployed at the same time but far away from each other. A UE connected to eNodeB1 may be moving towards eNodeB3. The UE sends a measuring report of eNodeB3/PCI-3 to eNodeB1. If eNodeB3 is already in eNodeB1's neighbor list (utilizing the PCI), the UE may be handed over to eNodeB3. If eNodeB3 is not in eNodeB1's neighbor list, eNodeB1 instructs the UE to read an Evolved Cell Global Identifier (ECGI) from eNodeB3. The ECGI is unique for each eNodeB throughout the network; however, the PCI may be reused throughout the network as long as coverage of cells with identical PCIs does not overlap.

Once the UE reads the ECGI for eNodeB3, the UE reports the ECGI broadcast for eNodeB3. eNodeB1 determines that an internet protocol (IP) address for eNodeB3 is unknown and request the IP address for the ECGI associated with eNodeB3 from a Mobile Management Entity (MME) or a domain name system (DNS). Once eNodeB1 knows the IP address for eNodeB3, X2 communication is established. eNodeB1 updates the element management system and handover occurs.

However, problems arise when another cell (eNodeB2) is deployed after eNodeB1 and eNodeB3 have been deployed and eNodeB2 has the same PCI as eNodeB3. In this instance, if UE is connected to eNodeB1 and moves towards eNodeB2, the UE sends a measuring report of eNodeB2/PCI-3 to eNodeB1. eNodeB1 checks its neighbor list and identifies PCI-3 as already existing in its neighbor list, but with an incorrect target of eNodeB3. Since PCI-3 is already in eNodeB1's neighbor list, eNodeB1 executes handover based on information in its neighbor list with eNodeB3 as the handover target. This causes the handover to fail and the call to drop since handover is executed to the wrong cell. Additionally, no handover will occur between eNodeB1 and eNodeB2 and the handover attempts will remain zero. SON ANR only considers the PCI when determining if a neighbor exists in the source neighbor list which does not account for uniqueness of an eNodeB.

Embodiments of the present invention overcome the SON ANR challenges in pop-corn networks described above by updating out-of-date neighbor lists. In embodiments, a master neighbor list comprising a plurality of neighbor lists created by self-organizing network (SON) Automatic Neighbor Relation (ANR) is maintained by the core network. Cell pairs in the master neighbor list with zero handover counts are identified. Each cell pair may comprise a source cell and a potential neighbor cell. A distance between each source cell and each corresponding potential neighbor cell having zero handover counts is determined. For each cell pair, a PCI (Physical Cell Identity) associated with a potential neighbor cell is identified. For each potential neighbor cell, an identity of a source neighbor cell in a source neighbor list corresponding to each source cell is determined, wherein the source neighbor cell having and the potential neighbor cell have a matching PCI. The distance between the source cell and the source neighbor cell is determined.

Accordingly, in one aspect, embodiments of the present invention are directed to one or more computer-readable storage media having computer-executable instructions embodied thereon that, when executed by a computing device, cause the computing device to facilitate a method of updating an out-of-date source neighbor list. The method comprises: maintaining a master neighbor list comprising a plurality of neighbor lists created by self-organizing network (SON) Automatic Neighbor Relation (ANR); identifying cell pairs in the master neighbor list with zero handover counts, each cell pair comprising a source cell and a potential neighbor cell; determining a distance between each source cell and each corresponding potential neighbor cell having zero handover counts; for each cell pair, identifying a PCI (Physical Cell Identity) associated with a potential neighbor cell; for each potential neighbor cell, determining an identity of a source neighbor cell in a source neighbor list corresponding to each source cell, the source neighbor cell having and the potential neighbor cell having a matching PCI; and determining the distance between the source cell and the source neighbor cell.

In another aspect, embodiments of the present invention are directed to a computer system for updating an out-of-date source neighbor list. The computer system comprises a processor coupled to a computer-storage medium, the computer-storage medium having stored thereon a plurality of computer software components executable by the processor. The computer software components comprise: a master neighbor list component that maintains a master neighbor list comprising a plurality of neighbor lists created by self-organizing network (SON) Automatic Neighbor Relation (ANR), each neighbor list comprising a latitude and longitude associated with a corresponding source cell and a number of handover counts per cell pair associated with the corresponding source cell; a zero handover count component that identifies cell pairs in the master neighbor list with zero handover counts, each cell pair comprising a source cell and a potential neighbor cell; a distance component that calculates a distance between each source cell and each corresponding potential neighbor cell having zero handover counts utilizing corresponding latitudes and longitudes; a PCI (Physical Cell Identity) component that identifies, for each cell pair, a PCI associated with a potential neighbor cell; an identity component that determines, for each potential neighbor cell, an identity of a source neighbor cell in a source neighbor list corresponding to each source cell; and the distance component calculating the distance between the source cell and the source neighbor cell utilizing corresponding latitude and longitudes.

In yet another aspect, embodiments of the present invention are directed to a method for updating an out-of-date source neighbor list. The method comprises: receiving, at the core network, a source neighbor list, the source neighbor list comprising a source cell, one or more neighbor cells, and a number of handover counts corresponding to each neighbor cell; applying, at the core network, an algorithm to the source neighbor list, the algorithm updating the source neighbor list; the algorithm identifying a potential neighbor cell in a master neighbor list with zero handover counts and determining the potential neighbor cell is closer in proximity to a source cell than a neighbor cell having a matching PCI (Physical Cell Identity) in the source neighbor list; and communicating an updated source neighbor list from the core network to the source cell, the updated source neighbor list comprising the source neighbor list with the potential neighbor cell added and the neighbor cell removed.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

3G Third-Generation Wireless Telephone Technology
    4G Fourth-Generation Wireless Telephone Technology
    ANR Automatic Neighbor Relation
    CDMA Code Division Multiple Access
    CD-ROM Compact Disk Read Only Memory
    CoMP Coordinated Multi-Point
    CRM Customer Relations Management
    CSR Cell Site Router
    DVD Digital Versatile Discs
    ECGI Evolved Cell Global Identifier
    EEPROM Electrically Erasable Programmable Read Only Memory
    ENODEB Evolved Node B
    GPRS General Packet Radio Service
    GPS Global Positioning System
    GSM Global System for Mobile Communications
    HLR Home Location Register
    iDEN Integrated Digital Enhanced Network
    IP Internet Protocol
    LTE Long Term Evolution
    MME Mobile Management Entity
    MMS Multimedia Messaging Service
    MSC Mobile Serving Center
    PC Personal Computer
    PCI Physical Cell Identity
    PCS Personal Communications Service
    PDA Personal Digital Assistant
    PLMN Public Land Mobile Network
    RAM Random Access Memory
    RF Radio Frequency
    ROM Read Only Memory
    SIB2 SystemInformationBlockType2
    SLA Service Level Agreement
    SMS Short Message Service
    SON Self-Organizing Network
    TDMA Time Division Multiple Access
    UCT Coordinated Universal Time
    UMTS Universal Mobile Telecommunications Systems
    VoIP Voice over IP
    WAN Wide Area Network
    Wi-Fi Wireless Fidelity WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Figure 1:
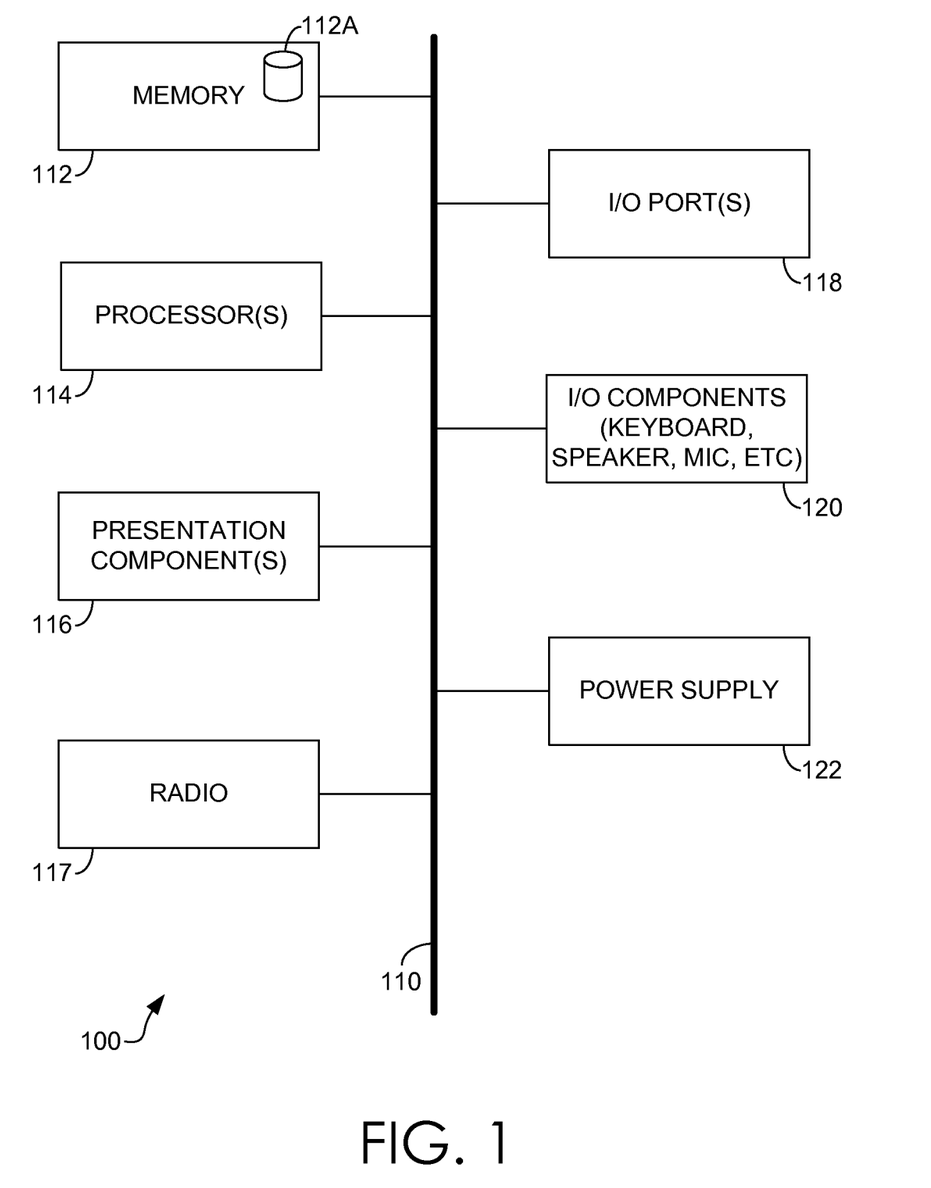
FIG. 1 depicts an illustrative device suitable for use in connection with embodiments of the invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 112A" or "application 112A" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include LTE, WiMAX, CDMA, GPRS, TDMA, GSM, Wi-Fi and the like. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
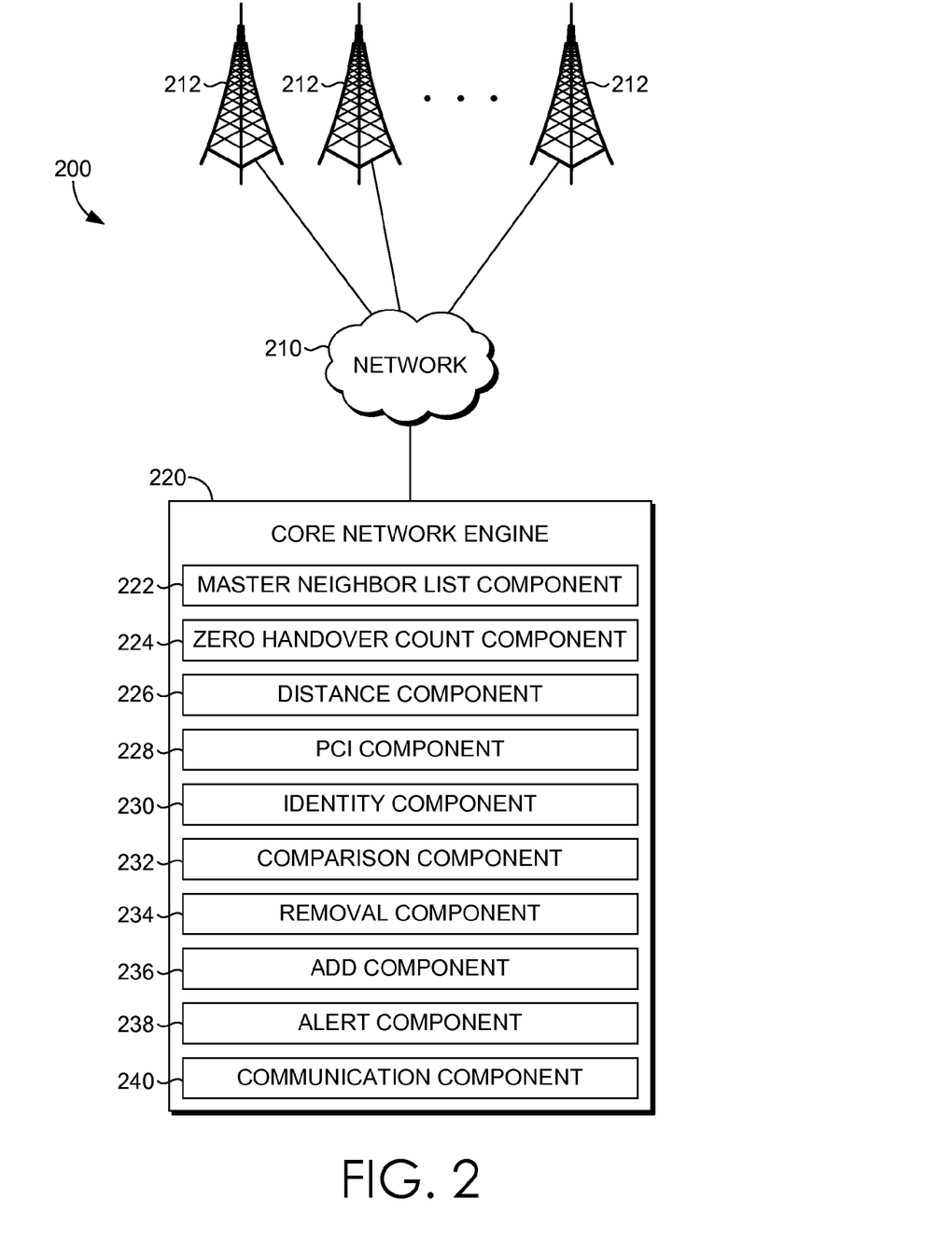
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, network 210 enables communication between user devices (e.g., mobile devices, servers, a personal computers, etc.). User devices may take on a variety of forms, such as a personal computer (PC), a laptop computer, a tablet, a netbook, a mobile phone, a smart phone, a personal digital assistant (PDA), or any other device that is cable of communicating with other devices. For example, the user device can take on any form, such as a mobile device or any other computing device capable of wirelessly communicating with the other devices using the network. Makers of illustrative devices include, for example, Research in Motion, Creative Technologies Corp., Samsung, Apple Computer, and the like. A user device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

User devices can utilize network 210 to communicate with other computing devices (e.g., a mobile device(s), a server(s), a personal computer(s), etc.). In embodiments, the network 210 is a telecommunications network(s), or a portion thereof. A telecommunications network might include an array of devices or components, some of which are not shown so as to not obscure more relevant aspects of the invention. Components such as terminals, links, and nodes (as well as other components) can provide connectivity in some embodiments. Network 210 can include multiple networks, as well as being a network of networks, but is shown in more simple form so as to not obscure other aspects of the present invention. The network 210 can be part of a telecommunication network that connects subscribers to their immediate service provider. In embodiments, the network 210 can be associated with a telecommunications provider that provides services to user devices. For example, the network 202 may provide voice services to user devices or corresponding users that are registered or subscribed to utilize the services (e.g., the network 210) provided by a telecommunications provider. The network 210 can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

In LTE networks, base stations 212 control user access to the network 210. Each base station 212 represents a cell of the LTE network. As described above, a user device may be connected to the network 210 via a source cell and as the user device approaches a neighbor cell, the source cell may handover the user device to the neighbor cell. Core network engine 220 reduces handover failures and dropped calls by preventing executing of the handover to the wrong cell. Core network engine 220 may include, in various embodiments, master neighbor list component 222, zero handover count component 224, distance component 226, PCI component 228, identity component 230, comparison component 232, removal component 234, add component 236, alert component 238, and communication component 240.

Master neighbor list component 222 maintains a master neighbor list comprising a plurality of neighbor lists created by self-organizing network (SON) Automatic Neighbor Relation (ANR). Each neighbor list comprises a latitude and longitude associated with a corresponding source cell and a number of handover counts per cell pair associated with the corresponding source cell. In other words, each source cell in the network has a neighbor list associated with it. The neighbor list includes neighbor cells known by the source cell as well as latitude and longitude for each neighbor cell in the neighbor list as well as for the source cell itself. The neighbor list also includes the number of handover counts indicating the number of times the source cell has executed a handover to the corresponding neighbor cell. Each neighbor list is aggregated at the core network to create the master neighbor list. Thus, the master neighbor list includes the latitude and longitude of each cell in the network as well as the number of times any cell has executed a handover to another cell.

Zero handover count component 224 identifies cell pairs in the master neighbor list with zero handover counts. Each cell pair comprises a source cell and a potential neighbor cell. For example, zero handover count component 224 analyzes the master neighbor list one-by-one for each cell and identifies cells that have not had a handover executed by a particular cell. Each cell that has not had a handover executed by a particular cell is a potential neighbor cell for the particular cell (i.e., the source cell).

Distance component 226 calculates a distance between each source cell and each corresponding potential neighbor cell having zero handover counts utilizing corresponding latitudes and longitudes. The distance is later utilized by the comparison component to determine if a potential neighbor cell is closer to the source cell than a neighbor cell already known by the source cell. PCI component 228 identifies, for each cell pair, a PCI associated with a potential neighbor cell. In other words, for each potential neighbor cell, a PCI is identified.

Identity component 230 determines, for each potential neighbor cell, an identity of a source neighbor cell in a source neighbor list corresponding to each source cell. The source neighbor cell and the corresponding potential neighbor cell have a matching PCI. For example, for networks implemented in a pop-corn fashion, a source cell may not be aware of a newly added cell (i.e., the potential neighbor cell) to the network that is closer in proximity than a known neighbor cell (i.e., the source neighbor cell) to the source cell with a matching PCI as the newly added cell. If the user device moves towards the newly added cell and communicates the PCI to the source cell, the source cell will attempt to handover the user device to the known neighbor cell. Consequently, the handover will fail or the call will be dropped.

To resolve this potential handover failure or dropped call, distance component 226 also calculates the distance between the source cell and the source neighbor cell utilizing corresponding latitude and longitudes. In one embodiment, comparison component 232 determines the distance of the potential neighbor cell is less than the distance of the source neighbor cell. Removal component 234 removes the source neighbor cell from the source neighbor list. Add component 236 adds the potential neighbor cell to the source neighbor list. As a result, when the source cell attempts to handover the user device to the added potential neighbor cell, the handover is executed successfully and the call is not dropped.

In one embodiment, comparison component 232 determines the distance of the potential neighbor cell is greater than or equal to the distance of the source neighbor cell. In one embodiment, alert component 238 provides an alert indicating other possible issues exist. For example, the user device is moving towards the source neighbor cell (and not a newly added cell with a matching PCI). Thus, the source cell is attempting a handover to the correct source neighbor cell. However, other issues may be causing the handover failure or the call to be dropped. Consequently, an alert is provided so that the other possible issues, such as hardware failure at either the source cell or the source neighbor cell may be investigated.

In one embodiment, communication component 240 communicates an updated source neighbor list to the source cell. This may be communicated on a regular or scheduled basis allowing each source cell to have an updated (i.e., up-to-date) source neighbor list. As a result, each source cell is aware of newly added cells (e.g., cells added in a pop-corn fashion) that may be closer in proximity than known neighbor cells with matching PCIs, reducing handover failures and dropped calls.

Figure 3:
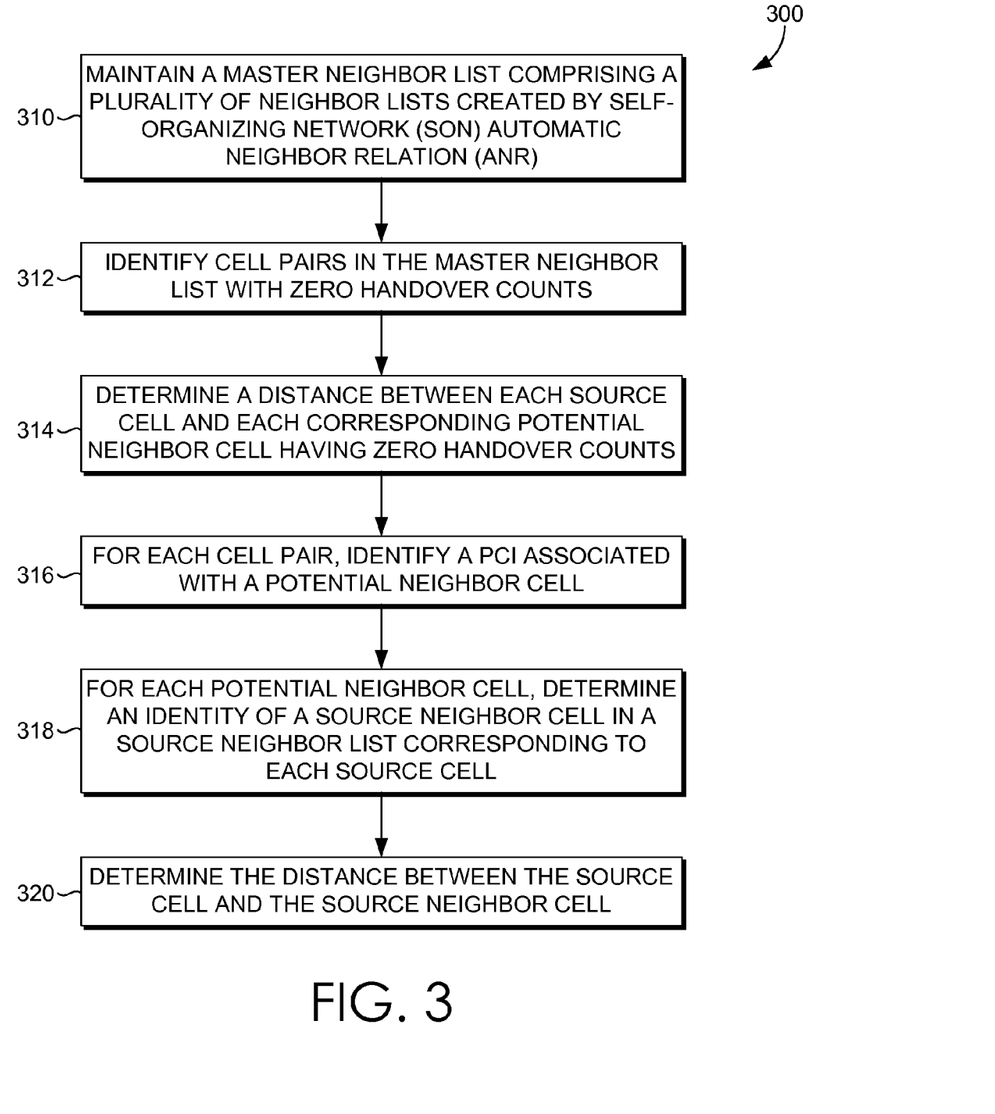
FIG. 3 is a flow diagram depicting an illustrative method for updating an out-of-date source neighbor list, in accordance with embodiments of the invention.

Referring now to FIG. 3, a flow diagram depicts an illustrative method 300 for updating an out-of-date source neighbor list, in accordance with embodiments of the invention. At step 310, a master neighbor list is maintained that comprises a plurality of neighbor lists created by self-organizing network (SON) Automatic Neighbor Relation (ANR). Cell pairs in the master neighbor list with zero handover counts are identified, at step 312. Each cell pair comprises a source cell and a potential neighbor cell.

A distance is determined, at step 314, between each source cell and each corresponding potential neighbor cell having zero handover counts. Each distance may be calculated utilizing the latitude and longitudes corresponding to the source cell and each potential neighbor cell. For each cell pair, at step 316, a PCI associated with a potential neighbor cell is identified. At step 318, for each potential neighbor cell, an identity of a source neighbor cell in a source neighbor list corresponding to each source cell is determined. The source neighbor cell that is identified has PCI that matches the PCI of the potential neighbor cell. In one embodiment, each source neighbor list comprises a latitude and longitude associated with a corresponding cell and a number of handover counts per cell pair associated with each cell.

The distance between the source cell and the source neighbor cell is determined, at step 320. In one embodiment, the distance is calculated utilizing the latitude and longitudes corresponding to the source cell and the source neighbor cell. In one embodiment, the distance of the potential neighbor cell is less than the distance of the source neighbor cell. More simply, in this example, the potential neighbor cell is closer to the source cell than the source neighbor cell that is included in the source neighbor list. Consequently, the source neighbor cell is removed from the source neighbor list. Further, the potential neighbor cell is added to the source neighbor list allowing handover to occur between the source cell and the potential neighbor cell.

In one embodiment, the distance of the potential neighbor cell is greater than or equal to the distance of the source neighbor cell. More simply, in this example, the source neighbor cell that is already included in the source neighbor list is closer to the source cell than the potential neighbor cell. Consequently, in one embodiment, an alert is provided indicating other possible issues exist. The other possible issues may comprise hardware issues at the source cell. Similarly, the other possible issues may include hardware issues at the source neighbor cell. These hardware issues may prevent a successful handover and/or result in a dropped call.

Figure 4:
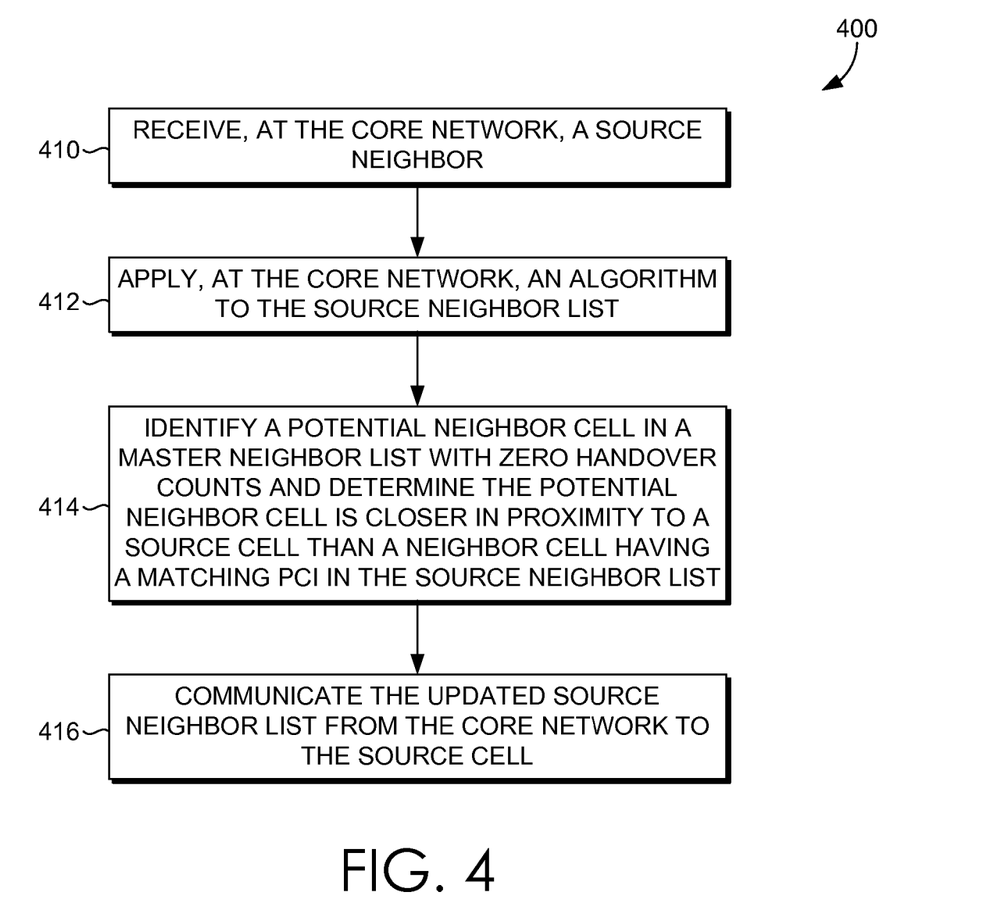
FIG. 4 is a flow diagram depicting an illustrative method for updating an out-of-date source neighbor list, in accordance with embodiments of the invention.

Referring now to FIG. 4, a flow diagram depicts an illustrative method 400 for updating an out-of-date source neighbor list, in accordance with an embodiment of the present invention. Initially, at step 410, a source neighbor list is received at the core network. The source neighbor list may comprise a source cell, one or more neighbor cells, and a number of handover counts corresponding to each neighbor cell. The core network may maintain a master neighbor list that is an aggregate neighbor list representing each source neighbor list for each cell in the network.

At step 412, an algorithm is applied at the core network to the source neighbor list to update the source neighbor list. The algorithm identifies, at step 414, a potential neighbor cell in a master neighbor list with zero handover counts and determines the potential neighbor cell is closer in proximity to a source cell than a neighbor cell having a matching PCI in the source neighbor list. For example, a potential neighbor cell may have recently come online for the network. Because the potential neighbor cell has not yet had a handover executed to it from the source cell, the potential neighbor cell has a zero handover count. The potential neighbor cell may have the same PCI as a neighbor cell currently in a particular source neighbor list for a particular source cell. If the potential neighbor cell is closer in proximity to the source cell than the neighbor cell with the same PCI, the algorithm updates the source neighbor list by removing the neighbor cell and adding the potential neighbor cell in its place. At step 416, the updated source neighbor list is communicated from the core network to the source cell.

In one embodiment, the source neighbor list is created via self-organizing network (SON) Automatic Neighbor Relation (ANR). In one embodiment, the algorithm is applied to the source neighbor list on a scheduled basis. For example, the algorithm may be applied to each source neighbor list on a daily basis to account for newly added cells (e.g., cells added in a pop-corn fashion). Similarly, the algorithm may be applied to each source neighbor list when newly added cell comes online.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. One or more non-transitory computer storage media storing computer-useable instructions that, when used by one or more computing devices, cause the one or more computing devices to perform operations comprising:
    maintaining a master neighbor list comprising a plurality of source neighbor lists for each source cell in a network, wherein the plurality of neighbor lists are created by a self-organizing network (SON) Automatic Neighbor Relation (ANR);
    in the plurality of source neighbor lists, identifying one or more cell pairs associated with a source cell, wherein each of the one or more cell pairs comprises the source cell and a neighbor cell or a potential neighbor cell;
    identifying at least one cell pair in the one or more cell pairs, the at least one cell pair comprising zero handover counts, wherein the at least one cell pair further comprises the source cell and a potential neighbor cell;
    determining a first distance between the source cell and the corresponding potential neighbor cell having zero handover counts;
    determining a second distance between the source cell and a neighbor cell already known to the source cell;
    determining that the first distance is less than the second distance;
    identifying a physical cell identity (PCI) associated with the potential neighbor cell; and replacing the neighbor cell with the potential neighbor cell.

2. The one or more non-transitory computer storage media of claim 1, wherein each neighbor list comprises a latitude and longitude associated with each cell.

3. The one or more non-transitory computer storage media of claim 2, wherein the first distance and the second distance are calculated utilizing corresponding latitudes and longitudes.

4. The one or more non-transitory computer storage media of claim 1, wherein replacing the neighbor cell with the potential neighbor cell comprises removing the neighbor cell from a corresponding source neighbor list in the plurality of source neighbor lists.

5. The one or more non-transitory computer storage media of claim 1, wherein replacing the neighbor cell with the potential neighbor cell comprises adding the potential neighbor cell to a corresponding source neighbor list in the plurality of source neighbor lists.

6. The one or more non-transitory computer storage media of claim 1, further comprising providing an alert indicating other possible issues exist.

7. The one or more non-transitory computer storage media of claim 6, wherein the other possible issues comprise hardware issues at the source cell or the source neighbor cell preventing a successful handover.

8. A computer system for updating an out-of-date source neighbor list, the computer system comprising:
    one or more processors; and
    a non-transitory computer storage media storing computer-useable instructions that, when used by the one or more processors, cause the one or more processors to:
        maintain a master neighbor list comprising a plurality of neighbor lists created by a self-organizing network (SON) Automatic Neighbor Relation (ANR), each neighbor list in the plurality of neighbor lists comprising a latitude and a longitude associated with each corresponding source cell and a number of handover counts per cell pair associated with each corresponding source cell;
        identify cell pairs in the master neighbor list with zero handover counts, each cell pair with the zero handover counts comprising a source cell and a potential neighbor cell;
        calculate a distance between each source cell and each corresponding potential neighbor cell having zero handover counts utilizing corresponding latitudes and longitudes;
        identify, for each cell pair, a physical cell identity (PCI) associated with the potential neighbor cell;
        determine, for the potential neighbor cell, an identity of the source cell in a source neighbor list, wherein a first distance between the source cell and a neighbor cell previously known to the source cell, and a second distance between the potential neighbor cell and the source cell are calculated utilizing corresponding latitudes and longitudes;

compare the first distance to the second distance; and communicate an updated source neighbor list to the source cell based on a result obtained by the comparison.

9. The computer system of claim 8, wherein the source neighbor cell and the potential neighbor cell have a matching PCI.

10. The computer system of claim 8, wherein the one or more processors further determine the second distance is less than the first distance.

11. The computer system of claim 10, wherein the one or more processors further remove the neighbor cell from the source neighbor list.

12. The computer system of claim 11, wherein the one or more processors further add the potential neighbor cell to the source neighbor list.

13. The computer system of claim 12, wherein the one or more processors further communicate an updated source neighbor list to the source cell.

14. The computer system of claim 8, wherein the one or more processors further determine that the second distance is greater than or equal to the first distance.

15. The computer system of claim 14, wherein the one or more processors further provide an alert indicating other possible issues exist.

16. A method of updating an out-of-date source neighbor list, the method comprising:

receiving, at a core network, a source neighbor list, the source neighbor list comprising a source cell, one or more neighbor cells, and a number of handover counts corresponding to each neighbor cell;

applying, at the core network, an algorithm to the source neighbor list, the algorithm updating the source neighbor list;

the algorithm identifying a potential neighbor cell with zero handover counts in a master neighbor list and determining the potential neighbor cell is closer in proximity to a source cell than a neighbor cell having a matching physical cell identity (PCI) in the source neighbor list; and communicating an updated source neighbor list from the core network to the source cell, the updated source neighbor list comprising the source neighbor list with the potential neighbor cell added and the neighbor cell removed.

17. The method of claim 16, wherein the source neighbor list is created via self-organizing network (SON) Automatic Neighbor Relation (ANR).

18. The method of claim 17, wherein the algorithm is scheduled to be applied to the source neighbor list on a configurable basis.

* * * * *